United States Patent [19]

DeYoung et al.

[11] 4,439,780

[45] Mar. 27, 1984

[54] INK JET APPARATUS WITH IMPROVED TRANSDUCER SUPPORT

[75] Inventors: Thomas W. DeYoung; Viacheslav B. Maltsev, both of Stormville, N.Y.

[73] Assignee: Exxon Research and Engineering Co., Florham Park, N.J.

[21] Appl. No.: 336,672

[22] Filed: Jan. 4, 1982

[51] Int. Cl.[3] .......... G01D 15/18

[52] U.S. Cl. .......... 346/140 R; 310/328

[58] Field of Search .......... 346/140 R; 310/328

[56] References Cited

U.S. PATENT DOCUMENTS

| | | | |
|---|---|---|---|
| 3,151,543 | 10/1964 | Preisinger | 346/141 X |
| 3,452,360 | 6/1969 | Williamson | 346/140 R X |
| 4,072,959 | 2/1978 | Elmquist | 346/140 R |
| 4,362,407 | 12/1982 | Kolm | 400/124 |
| 4,367,478 | 1/1983 | Larsson | 346/140 R |

*Primary Examiner*—Joseph W. Hartary

*Attorney, Agent, or Firm*—Norman L. Norris

[57] ABSTRACT

An ink jet array comprises a plurality of elongated transducers coupled to a plurality of ink jet chambers. The transducers are supported at longitudinal extremities only so as to minimize cross-talk between jets within the array. The support at the extremity remote from the chamber is provided such that no longitudinal motion along the axis of elongation of the transducers occurs. The support at the other extremity includes bearings precluding substantially lateral movement transverse to the axis of elongation but permitting longitudinal movement along the axis of elongation.

17 Claims, 9 Drawing Figures

INK JET APPARATUS WITH IMPROVED TRANSDUCER SUPPORT

BACKGROUND OF THE INVENTION

This invention relates to apparatus wherein droplets of ink are ejected from an orifice of an ink jet, and more particularly, to the manner in which transducers which control the ejection of droplets from an orifice are supported.

Copending application Ser. No. 336,603, filed Jan. 4, 1982 discloses an ink jet apparatus comprising an array of demand or impulse jets wherein each jet ejects a droplet of ink from an orifice in response to the expansion and contraction of elongated transducers which are energized in response to a field selectively applied transversely to the axis of elongation. As a result, substantial displacement of the transducers is achieved which is capable of ejecting a droplet of ink using relatively low drive voltages across the transducer thus minimizing the risk of electrical cross-talk between ink jets in the array. However, mechanical cross-talk can result due to the extensive contact between the transducer and the structure which supports the transducer.

U.S. Pat. No. 4,072,959—Elmquist discloses elongated transducer segments which are driven by applying a voltage transversely to the axis of elongation. Ends of the elongated transducer segments are integrally joined so as to create a substantial potential for mechanical cross-talk through the transducer itself. Moreover, the transducer segments are all immersed in an ink reservoir so as to provide substantial potential for fluidic cross-talk through the ink itself.

In addition to the problems of cross-talk addressed in the foregoing, it is important that the manner in which the transducers are supported permit a freedom of longitudinal displacement along the axis of elongation of the transducers. If such displacement is impeded, higher voltages will, of course, be necessary to drive the transducers and this, in turn, will produce electrical cross-talk. At the same time, it is important that the transducers be supported in such a way so as to permit a precision in longitudinal displacement which is coupled into the ink jet chambers which can be readily coupled into the ink jet chambers to eject droplets of ink. Moreover, it is desirable to provide support for the transducers while still permitting ease of assembly.

SUMMARY OF THE INVENTION

It is an object of this invention to provide an improved transducer support for ink jets wherein elongated transducers are utilized which are energized in a direction transverse to the direction of elongation so as to couple the expansion and contraction along the axis of elongation into the chambers of the ink jets.

It is another object of this invention to provide transducer support wherein cross-talk between ink jets may be minimized.

It is a further object of this invention to provide transducer support with a high degree of precision.

It is a still further object of this invention to provide transducer support which facilitates assembly of an ink jet.

In accordance with these and other objects of the invention, the preferred embodiment comprises one or more ink jets having a chamber with an ink droplet ejection orifice therein. An elongated transducer is coupled to the chamber for expanding and contracting the transducer in response to energization thereof along the axis of elongation. Means are provided for applying a field transverse to the axis of elongation of the transducer for expanding and contracting the transducer along the axis of elongation.

In accordance with this invention, improved transducer support means include transducer mounting means coupled to the transducer remote from the chamber for substantially preventing longitudinal motion of the transducer along the axis of elongation at the mounting means. The transducer support further comprises transducer bearing means coupled to the extremity of the transducer adjacent the chamber for substantially preventing lateral motion of the transducer transverse to the axis of elongation at the one extremity without substantially limiting longitudinal motion of the transducer along the axis of elongation at the one extremity. The mounting means and the bearing means are mutually spaced such that the transducer is substantially unsupported therebetween.

In the preferred embodiment of the invention, coupling means are provided between the chamber and the transducer and the coupling means is engaged by the bearing means. The coupling means may comprise a foot attached to the transducer and the bearing means may comprise a hole receiving the foot. Preferably, the foot is cylindrical in cross-section and the hole is also cylindrical in cross-section with the hole slightly larger relative to the foot so as to assure no more than a line contact therebetween. Coupling means may also comprise a diaphragm between the chamber and the foot with a viscoelastic material sandwiched between the foot and the diaphragm which assist in maintaining the lateral position of the transducer at the diaphragm.

In one preferred embodiment of the invention, the transducer support means includes intermediate means which in combination with the mounting means and the bearing means is C-shaped in cross-section. The intermediate means is spaced from the transducer so as to avoid any contact with the transducer.

In one embodiment of the invention, the transducer mounting means comprises a plurality of slots receiving a plurality of transducers so as to form a comb-like structure. In another embodiment of the invention, the transducer mounting means comprises a plurality of openings in which a plurality of transducers are fixedly mounted.

In accordance with one important aspect of the invention, the transducer bearing means has an overall length as measured along the axis of elongation of the transducer which is substantially less than the overall length of the transducer along the axis of elongation. Preferably, the overall length of the bearing means is less than twice the maximum cross-sectional dimension of the transducer.

DETAILED DESCRIPTION OF THE PREFERRED EMBODIMENTS

Figure 1:
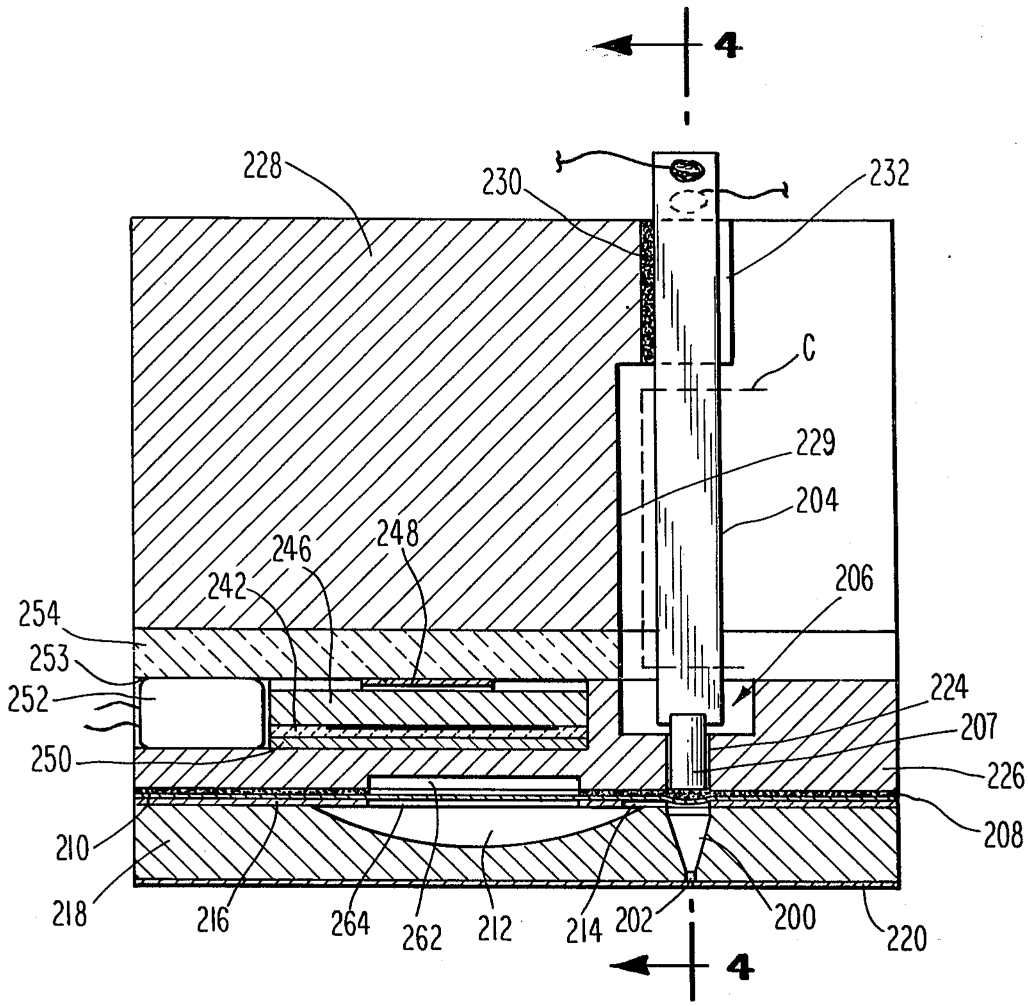
FIG. 1 is a sectional view of an ink jet apparatus constructed in accordance with the principles of this invention.
Figure 3:
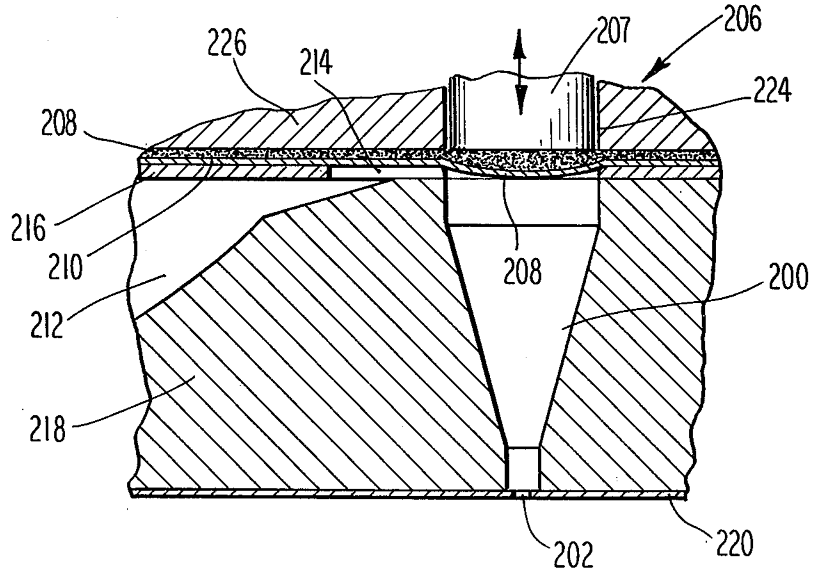
FIG. 3 is an enlarged sectional view of a portion of the apparatus shown in FIG. 1.
Figure 2:
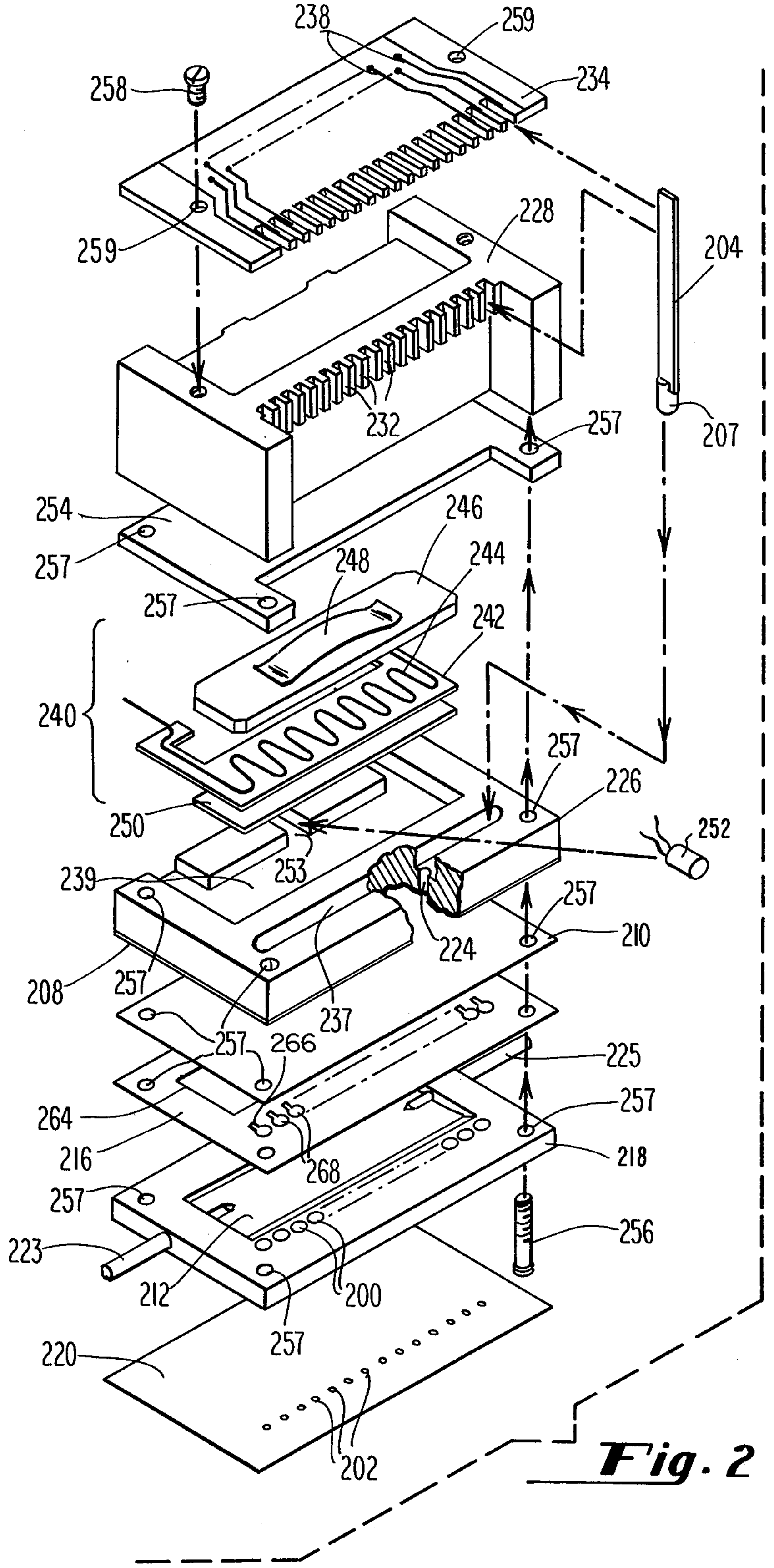
FIG. 2 is an exploded perspective view of the apparatus of FIG. 1.

Referring to FIGS. 1 through 3, an ink jet apparatus comprises a plurality of chambers 200 having orifices 202 in an orifice plate 220 for ejecting droplets of ink in response to the state of energization of transducers 204. The transducers 204 which are rectangular in cross-section transverse to the axis of elongation expand and contract along the axis of elongation as depicted by the arrowhead shown in FIG. 3. The resulting movement of the transducers 204 along the axis of elongation is coupled into the chamber 200 by coupling means 206 including a foot 207, a viscoelastic material 208 juxtaposed to the foot 207 and a diaphragm 210 which is preloaded to a position best shown in FIG. 3 in accordance with the invention of copending application Ser. No. 336,601, filed Jan. 4, 1982 which is assigned to the assignee of this invention and incorporated herein by reference.

Ink flows into the chamber 200 from a reservoir 212 through a restricted inlet means provided by a restricted opening 214 best shown in FIG. 3. The opening 214 is located in a restrictor plate 216 best shown in FIG. 2.

In accordance with the invention of copending application Ser. No. 336,602, filed Jan. 4, 1982 which is assigned to the assignee of this invention and incorporated herein by reference, the reservoir 212 is formed by a concave region in a chamber plate 218 which is covered by the restrictor plate 216 so as to form an acute angle along one side of the reservoir 212 leading to the inlet 214. A feed or input tube 223 and a vent tube 225 communicate with the reservoir 212 at opposite ends as shown in FIG. 2.

In accordance with this invention, each of the transducers 204 are supported at the extremities thereof with intermediate portions being essentially unsupported as best shown in FIG. 1. More specifically, FIG. 1 discloses a transducer support means including a plate 226 and a plate 228. The plate 226 of the transducer support means includes bearing means in the form of a hole 224 which receives the foot 207 attached to an extremity of the transducer 204. It will be appreciated that the foot 207 is free to move longitudinally within the hole 224 thereby permitting longitudinal motion of the transducer along the axis of elongation of the transducer 204 while substantially preventing lateral motion of the transducer 204.

Figure 4:
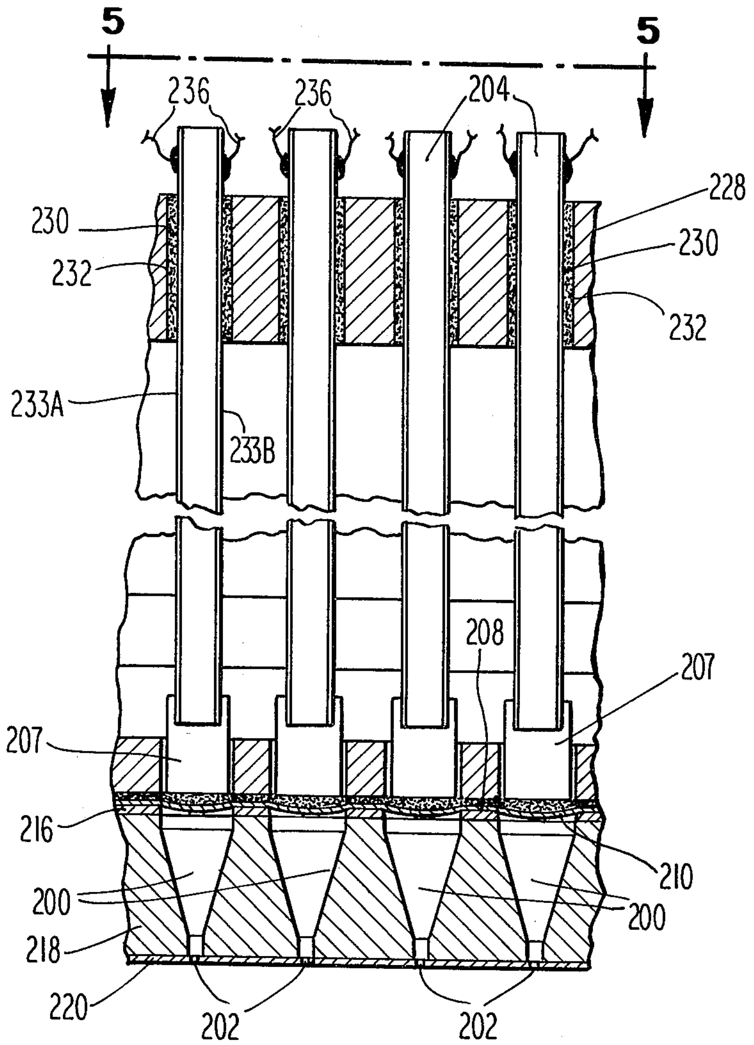
FIG. 4 is a sectional view of the apparatus of FIG. 1 taken along line 4—4.
Figure 5:
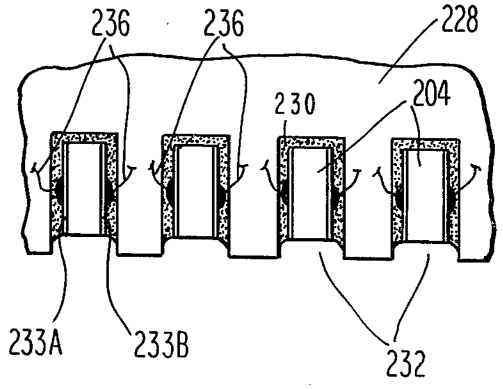
FIG. 5 is a sectional view of the apparatus of FIG. 4 taken along line 5—5.
Figure 6:
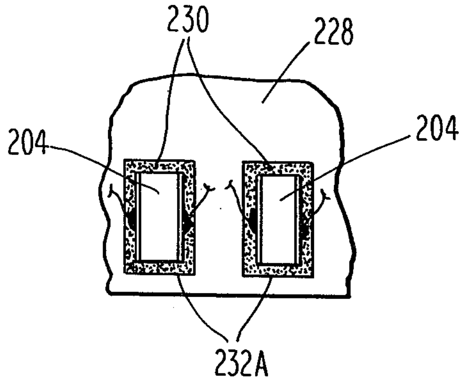
FIG. 6 is an alternative embodiment of the apparatus shown in FIG. 4.

Mounting means for the transducer 204 provided by the plate 228 includes slots 232 best shown in FIG. 2 and compliant mounting means 230 located within the slots 232 as best shown in FIGS. 4 through 6 which clamp the transducer 204. The compliant means 230 are the invention of copending application Ser. No. 336,600, filed Jan. 4, 1982 which is assigned to the assignee of the invention and incorporated herein by reference. The compliant means 230 in conjunction with the slots 232 are coupled to the extremities of the transducers 204 remote from the chamber. This mounting means substantially prevents any longitudinal motion of the transducers along the axis of elongation at the compliant clamping means 230 such that expansion and contraction of the transducer 204 is translated along the transducer 204 and into movement of the foot 207 through the bearing holes 224 in the plate 226.

In reference to FIG. 1, it will be readily appreciated that the mounting means provided by the plate 228 at the slots 232 and the bearing means provided by the plate 226 at the holes 224 are mutually spaced such that the transducers 204 are substantially unsupported along the length thereof between the extremities thereof thus minimizing cross-talk with one important aspect of this invention.

As perhaps best shown in FIG. 3, the hole 224 is slightly larger than each of the feet 207. Assuming perfect cylinders for the feet 207 and the holes 224, it will be understood that minimal physical contact will be achieved between the feet 207 and the holes 224. In fact, only line or tangential contact will occur between the feet 207 and the holes 224 thus minimizing the possibility of cross-talk. Moreover, it is possible that the viscoelastic material 208 could locate each of the feet 207 in the hole 224 so as to preclude any contact whatsoever. However, the contact which is achieved between the feet 207 and the holes 224 is minimal in any event and no special care need be taken in the assembly of the apparatus as shown in FIGS. 1 through 3 to avoid such contact.

In accordance with this invention, the plate 228 includes a recessed area 229 shown in FIG. 1 below the slots 232 which is spaced from the transducer 204. Thus there is no contact along the area 229. Moreover, it will be appreciated that portions of the plate 228 including the slots 232 in conjunction with the area 229 and the portion of the plate 226 extending toward the holes 224 forms a C-shaped cross-section designated with broken lines identified with the character C where the region 229 forms the center of the C. Note that the space between the region 229 and the transducer permits the transducer to have a substantially larger dimension than the foot 207 while still avoiding contact with the plate 228. Moreover, the foot 207 extends sufficiently far upwardly toward the slots 232 so as to assure that the transducer 204 may expand and contract withut contacting any portion of the plate 226. Thus, the transducer 204 may be rectangular in cross-section having a substantially greater dimension in the direction shown in the plane of FIG. 1 as compared with the direction shown in the plane of FIGS. 4 and 5.

As shown in FIG. 1, the overall length of the longitudinal bearing surface represented by the hole 224 in the direction of the axis of elongation of the transducer 204 is substantially less than the overall length of the transducer 204 along that axis. Preferably, the overall length of the bearing surface 224 along the axis is less than twice the maximum cross-sectional dimension of the transducer as also shown in FIG. 1.

Referring to FIGS. 4 and 5, it will be observed that the compliant material 230 surrounds three sides of the transducers 204 in the slots 232. Although a variety of compliant materials 230 may be utilized, one particularly preferred compliant material is silicone rubber as disclosed in detail in the aforesaid copending application Ser. No. 336,600, filed Jan. 4, 1982.

In addition to the compliant mechanical mounting of the transducers 204, the electrical connection to the transducers 204 at electrodes 233A and 233B as shown in FIGS. 4 and 5 is accomplished in a compliant manner by means of a compliant printed circuit 234 as shown in FIG. 2. The compliant circuit 234 is electrically coupled by suitable means such as solder or electrical leads 236 as shown in FIG. 4. As shown in FIG. 2, the electrical connections to the printed circuit 234 allow the electrodes 233A and 233B to be driven by means of drive voltages applied through conductive patterns 238 on the printed circuit board 234.

As shown in FIG. 6, the slots 232 shown in FIG. 5 may comprise holes 232A as shown in FIG. 6. The compliant material 230 then fills the holes 232A so as to separate the transducers 204 from the plate 228.

In the embodiment of FIGS. 4 and 5 as well as the embodiment of FIG. 6, it is important that the compliant material 230 be capable of maintaining the portion of the transducer 204 juxtaposed to the compliant material 230 in a substantially fixed position such that the longitudinal displacement of the transducer is downwardly toward the chambers 200 as shown in FIG. 4. In this regard, the choice of the compliant material is critical. As indicated above, silicon rubber has been found to be particularly appropriate for this purpose since the compliance afforded by the silicone rubber minimizes cross-talk from chamber-to-chamber and channel-to-channel while at the same time providing a sufficiently fixed condition for the transducers 204 to achieve the necessary displacement at the chambers 200.

As shown in FIG. 2, the plate 226 includes holes 224 at the base of a slot 237 for receiving the transducers 204 and also includes a receptacle 239 for a heater sandwich 240 including a heater element 242 with coils 244, a hold down plate 246, a spring 248 associated with the plate 246 and a support plate 250 located immediately beneath the heater 240. In order to control the temperature of the heater 242, a thermistor 252 is provided which is received in a slot 253. The entire heater 240 is maintained with the receptacle in the plate 226 by a cover plate 254.

As shown in FIG. 2, the entire structure of the ink jet apparatus including the various plates or laminations are held together by means of bolts 256 which extend upwardly through openings 257 in the structure and bolts 258 which extend downwardly through holes 259 so as to hold the printed circuit board 234 in place on the plate 228. The viscoelastic layer 208 is shown in FIG. 2 as adhering to the base or bottom of the plate 226.

The reservoir 212 is at least partially compliant and more specifically, includes a compliant wall portion. As shown in FIG. 1, the diaphragm 210 extends across the entire apparatus so as to cover the reservoir 212 and extend between the foot 207 and the chamber 200. Thus, the diaphragm 210 is in direct communication with the reservoir 212 on one side and juxtaposed to an area of relief 262 on the opposite side of the diaphragm 210. This area of relief which extends along the length of the reservoir, i.e., from the first chamber 200 to the last chamber 200 in the chamber plate 220 as shown in FIG. 2, allows the wall of the reservoir 212 formed by the diaphragm 210 to be compliant and thereby minimize cross-talk between the various ink jet chambers. It will be observed that the restrictor plate 216 includes an opening 264 aligned with the area of relief 262 so as to provide direct communication between the diaphragm 210 and the reservoir thereby providing the necessary compliance. As best shown in FIG. 2, the restrictor plate 216 includes another opening 268 having a radially extending slot 266 for each chamber in the array. Slot 266 provides the inlet 214 to the chamber 200 as shown in FIGS. 1 and 3 while the opening 268 permits direct communication between the diaphragm 210 and the chamber 200 which couples the movement of the transducer 204 as transmitted through the foot 207 and along the bearing 224 into the chamber 200.

Figure 7:
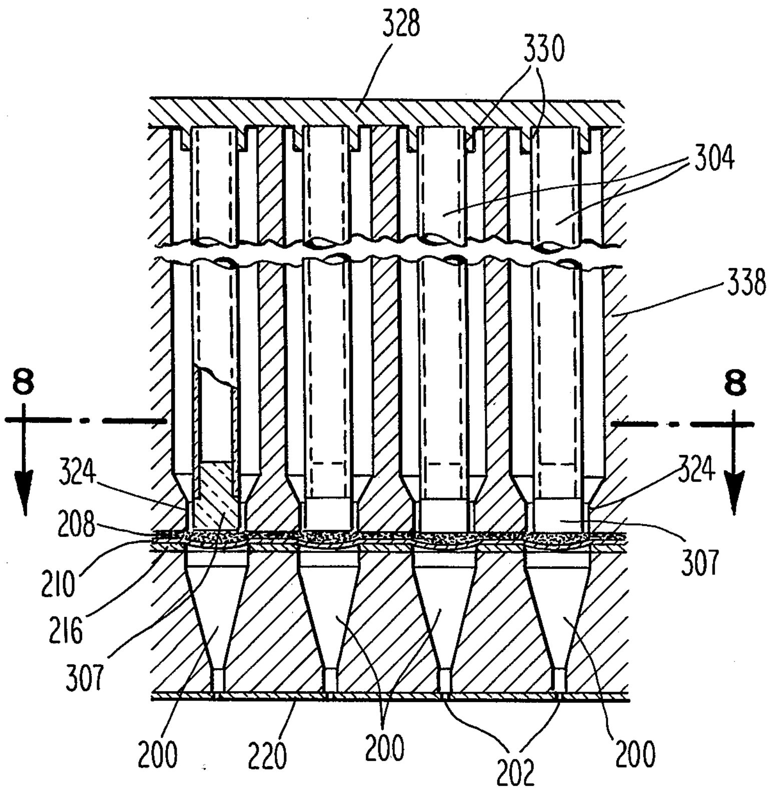
FIG. 7 is a sectional view of another embodiment of the invention.
Figure 9:
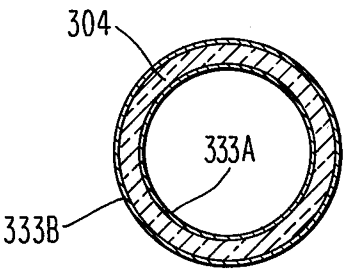
FIG. 9 is an enlarged view of a cylindrical transducer shown in FIG. 8.
Figure 8:
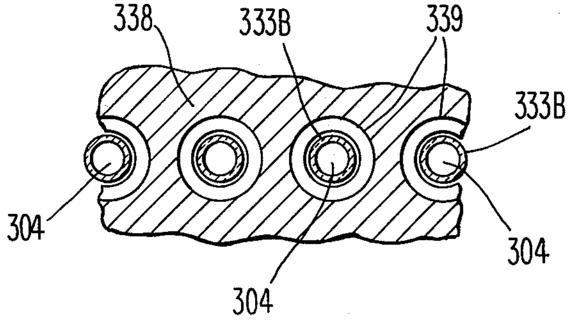
FIG. 8 is a sectional view taken along line 8—8 of FIG. 7.

Reference will now be made to FIGS. 7 through 9 and another embodiment of the invention. The embodiment shown therein comprises transducers 304 which are cylindrical in cross-section as best shown in FIG. 9. The transducers 304 are supported by mounting means comprising a plate 328 having a series of cylindrical openings 330 which receive the extremities of each of a plurality of the transducers 304. The plate 328 in conjunction with the openings 330 provide a relatively stationary or fixed mounting for the extremity of the transducers 304 substantially precluding any longitudinal motion along the axis of elongation of the transducers 304 at the extremity mounted within the opening 330. It will be appreciated that suitable electrical connection to the transducers 304 will be made at the plate 328.

An intermediate structure 338 is terminated in cylindrical openings 324 which provide bearing means for the transducers 304 permitting longitudinal motion of feet 307 attached to the transducers 304 while substantially precluding substantial lateral motion. Once again, the only contact between the substantially cylindrical feet 307 and a substantially cylindrical bearing surface offered by the openings 324 will be line or tangential contact thereby minimizing cross-talk between the various jets represented by the various chambers 200. It will be appreciated that the transducers 304 are energized by applying a voltage across the thickness of the cylindrical walls of the transducer 304 by means of electrodes 333A and 333B best shown in FIG. 9. Here again, contact is made between each of the feet 307 and the viscoelastic material 208 which does not serve the position of the feet 307 and thus the transducer 304 is confined in the lateral direction at least to some degree.

Referring to FIG. 8, it will be observed that a substantial space is maintained between the outer electrode 333B and the walls of openings 339 within the plate 328. This, of course, assures that cross-talk from channel-to-channel or chamber-to-chamber will be minimized.

By referring to FIGS. 1 through 6 as well as FIGS. 7 through 9, it will be readily appreciated that the bearing means formed by the holes or openings 224 and 324 readily assist in the assembly or fabrication of the ink jet arrays. In this connection, it will be appreciated that the feet 207 or 307 associated with the transducers 204 and 304 are readily positioned juxtaposed to the chambers 200 and 300 by virtue of the centering or alignment function served by the bearing means offered by the holes 224 and 324.

Although particular embodiments of the invention have been shown and described herein, it will be appreciated that other embodiments as well as modifications will occur to those of ordinary skill in the art. Such embodiments and modifications will fall within the true spirit and scope of the invention as set forth in the appended claims.

We claim:

1. An ink jet comprising a chamber having an ink droplet ejection orifice, an elongated transducer coupled to said chamber for expanding and contracting along the axis of elongation in response to energization thereof so as to vary the volume of the chamber, the improvement comprising transducer support means including: p1 transducer mounting means coupled to the transducer remote from the chamber for substantially preventing longitudinal motion of the transducer along the axis of elongation at the mounting means;

transducer bearing means coupled to the extremity of the transducer adjacent the chamber for substantially preventing lateral motion of the transducer transverse to the axis of elongation at the extremity without substantially affecting longitudinal motion of the transducer along the axis of elongation at the bearing means;

said mounting means and said bearing means being mutually spaced and said transducer being substantially unsupported along the length thereof between said mounting means and said bearing means.

2. The apparatus of claim 1 further comprising coupling means between said chamber and said transducer at said extremity, said coupling means adapted to engage said bearing means.

3. The apparatus of claim 2, wherein said coupling means comprises a foot attached to said transducer and said bearing means comprises a hole receiving said foot.

4. The apparatus of claim 3 wherein said foot is cylindrical in cross-section and said hole is cylindrical in cross-section, said hole being sufficiently large relative to said foot so as to assure line contact therebetween.

5. The apparatus of claim 3 wherein said coupling means comprises a diaphragm between said chamber and said foot.

6. The apparatus of claim 5 wherein said coupling means further comprises viscoelastic means between said diaphragm and said foot.

7. The apparatus of claim 1 further comprising intermediate means between said mounting means and said bearing means.

8. The apparatus of claim 7 wherein said intermediate means, said mounting means and said bearing means form a C-shaped cross-section.

9. The apparatus of claim 1 wherein said mounting means comprises a slot receiving said transducer.

10. The apparatus of claim 1 wherein said mounting means comprises a hole receiving said transducer.

11. The apparatus of claim 1 wherein the overall length of said bearing means in a direction parallel with the axis of elongation is less than the overall length of the elongated transducer along the axis of elongation.

12. The apparatus of claim 11 wherein the overall length of said bearing means is less than twice the maximum cross-sectional dimension of the transducer transverse to the axis of elongation.

13. An ink jet array comprising a plurality of said ink jet apparatus as recited in claim 1.

14. An ink jet array comprising a plurality of chambers having an ink droplt ejection orifice therein, a plurality of elongated transducers coupled to said chambers for varying the volume of said chambers as said transducers expand and contract along the axis of elongation extending between opposing extremities of the transducers, the improvement comprising:

a comb-like supporting means including a plurality of slots extending along one side for receiving elongated portions of transducers intermediate said extremities.

15. The apparatus of claim 14 including bearing means coupled to said transducers for permitting longitudinal motion along each said axis of said transducers through said bearing means.

16. The ink jet apparatus of claim 15 wherein said bearing means comprise a plurality of openings.

17. The ink jet apparatus of claim 16 comprising a plurality of feet attached to each of said transducers, said feet extending through said openings and bearing upon the walls of said openings.

* * * * *